US009639692B1

(12) United States Patent
Xue

(10) Patent No.: US 9,639,692 B1
(45) Date of Patent: May 2, 2017

(54) DYNAMIC ON-DEVICE PASSCODES TO LOCK LOST OR STOLEN DEVICES

(71) Applicant: Symantec Corporation, Mountain View, CA (US)

(72) Inventor: Yong Ling Xue, Beijing (CN)

(73) Assignee: Symantec Corporation, Mountain View, CA (US)

( * ) Notice: Subject to any disclaimer, the term of this patent is extended or adjusted under 35 U.S.C. 154(b) by 63 days.

(21) Appl. No.: 14/471,740

(22) Filed: Aug. 28, 2014

(51) Int. Cl.
  *G06F 21/46* (2013.01)
  *G06F 21/88* (2013.01)
  *H04L 29/06* (2006.01)

(52) U.S. Cl.
  CPC .............. *G06F 21/46* (2013.01); *G06F 21/88* (2013.01); *H04L 63/0846* (2013.01)

(58) Field of Classification Search
  CPC ........... G06F 21/62; G06F 21/60; G06F 21/88
  See application file for complete search history.

(56) References Cited

U.S. PATENT DOCUMENTS

| 2011/0113245 A1* | 5/2011 | Varadarajan | G06F 21/34 713/168 |
| 2015/0148007 A1* | 5/2015 | Mitchell | H04W 12/12 455/411 |

* cited by examiner

*Primary Examiner* — Izunna Okeke
(74) *Attorney, Agent, or Firm* — Wilmer Cutler Pickering Hale and Dorr LLP

(57) ABSTRACT

Dynamic on-device passcode to lock lost device is described. In one method, a security agent executing on a processor of a user device periodically generates a dynamic passcode using a cryptographic function and a cryptographic seed according to a predefined time interval. While the user device is in a first state, the security agent sends the cryptographic seed to an authentication service. The method receives an acknowledgement of receipt of the cryptographic seed from the authentication service and detects that the user device is in a potentially lost or stolen state based on a defined condition of the user device. In response to the detecting that the user device is in the potentially lost or stolen state, the method locks the user device and may unlock the user device when a current instance of the dynamic passcode is correctly entered on the user device.

20 Claims, 5 Drawing Sheets

DYNAMIC ON-DEVICE PASSCODES TO LOCK LOST OR STOLEN DEVICES

BACKGROUND

The need for strong mobile device security is increasing rapidly as users are increasingly storing private information on their mobile devices. Because of the valuable information contained on modern mobile devices, they are popular target for thieves and hackers. Traditional security measures have typically included allowing a user to remotely lock his or her device over a network once he or she realized that the device has been lost or stolen, thus requiring the thief or finder to enter the correct passcode to access the device. There are several problems with such a solution. Many thieves will immediately disable the device's ability to connect to a network (e.g. by removing the device's subscriber identity module (SIM) card) and therefore any attempt to remotely lock the device will fail. Also, many users will not realize that their device has been lost or stolen for some period of time after the act. In this case, a thief may be free to access the data on the device for several minutes or even hours before the user attempts to remotely lock the device. In addition, a remotely transmitted passcode to the user device may be intercepted by a hacker. Typical passcodes are static, meaning they don't change over time, which makes them susceptible to brute force (trial and error) methods of hacking.

SUMMARY

Methods for dynamic on-device passcode to lock lost device are described. A method may include periodically generating, by a security agent executing on a processor of a user device, a dynamic passcode using a cryptographic function and a cryptographic seed according to a predefined time interval. In one embodiment, the dynamic passcode may be generated according to a predefined time interval. In one embodiment, the predefined time interval is user configurable.

While the user device is in a first state (e.g. an unlocked state or a normal locked state) the security agent may send the cryptographic seed to an authentication service executing on a server device over a network. In one embodiment, the first state may indicate that the user device is not in a potentially lost or stolen state. If the cryptographic seed is successfully received by the authentication service, the security agent may receive an acknowledgement of receipt of the cryptographic seed from the authentication service. In one embodiment, all communication between the user device and the authentication service is over a secure channel.

The security agent may lock the user device when it detects that the user device is in a second state (e.g. a potentially lost or stolen state) based on a defined condition of the user device. In one embodiment, removal of the user device's SIM card without authorization from the security agent may be a defined condition. In another embodiment, a defined condition may be putting the user device into airplane mode without authorization from the security agent. In another embodiment, removing the device from a predetermined geographical area may be a defined condition, upon detection of the user device may be put into a potentially lost or stolen state.

In one embodiment, when the user device is in a potentially locked or stolen state, the security agent may lock the user device with the dynamically generated passcode. The security agent may unlock the user device when a current instance of the dynamic passcode is correctly entered on the user device. In one embodiment, the current instance of the dynamic passcode is only valid for the current time interval. Once the current time interval expires, a new instance of the dynamic passcode will be generated and that instance will be valid for the current time interval. In one embodiment, a user may obtain a copy of the current instance of the dynamic passcode generated by the authentication service or a recovered copy of the current instance of the dynamic passcode generated by the authentication service.

Further, a system for dynamic on-device passcode to lock lost device is described. An exemplary system may include a memory and a processor coupled to the memory. The processor is configured to perform the operations described above.

In addition, a non-transitory computer readable storage medium for dynamic on-device passcode to lock lost device is described. The non-transitory computer readable storage medium includes instructions that, when executed by a processor, cause the processor perform the operations described above. In addition, a user device comprising a memory device and a processor coupled to the memory device is described. The processor is to execute a security agent. The security agent is a service to perform the operations described above.

BRIEF DESCRIPTION OF THE DRAWINGS

The present disclosure will be understood more fully from the detailed description given below and from the accompanying drawings of various implementations of the disclosure.

DETAILED DESCRIPTION

Described herein are methods for dynamic on-device passcode to lock lost device. The terms cryptographic seed and cryptograph function are used in relation to dynamic passcode generation. A cryptographic seed may refer to an input to a cryptographic function. In one embodiment, a time-based seed may be used. In one embodiment, a cryptographic function may refer to a function that takes a cryptographic seed as an input and, based on the cryptographic seed, outputs a passcode. In one embodiment, a time-based cryptographic seed is combined with a counter in the cryptographic function to create a unique passcode. Various types of seed-based cryptography functions exist. In one embodiment, symmetric-key cryptography may be used to dynamically generate a passcode. Symmetric-key cryptography refers to encryption methods in which both the sender (e.g. security agent) and receiver (e.g. authentication service) share the same key (e.g. a time-based seed). Symmetric key ciphers may be implemented as either block ciphers or stream ciphers. A block cipher enciphers input in blocks of plain text as opposed to individual characters, the input form used by a stream cipher. The Data Encryption Standard (DES) and the Advanced Encryption Standard (AES) are some examples of block cipher designs.

In one embodiment, stream ciphers, in contrast to the 'block' type, create an arbitrarily long stream of key material, which is combined with the plaintext bit-by-bit or character-by-character, somewhat like the one-time pad. In a stream cipher, the output stream is created based on a hidden internal state which changes as the cipher operates. That internal state is initially set up using the secret key material. RC4 is an example of a stream cipher. Cryptographic hash functions are a third type of cryptographic algorithm. In one embodiment, a cryptographic hash function takes a message of any length as input, and outputs a short, fixed length hash which can be used as a digital signature or passcode. One example of a cryptographic has function is the SHA-3 function.

Any cryptographic function, including those described above, may be used to generate the dynamic passcode. In one embodiment, a dynamic passcode generator creates a dynamic passcode using a time-based cryptographic seed and function. An authentication service, knowing the cryptographic function, may receive the cryptographic seed and use it to create a copy of the dynamic passcode.

Figure 1:
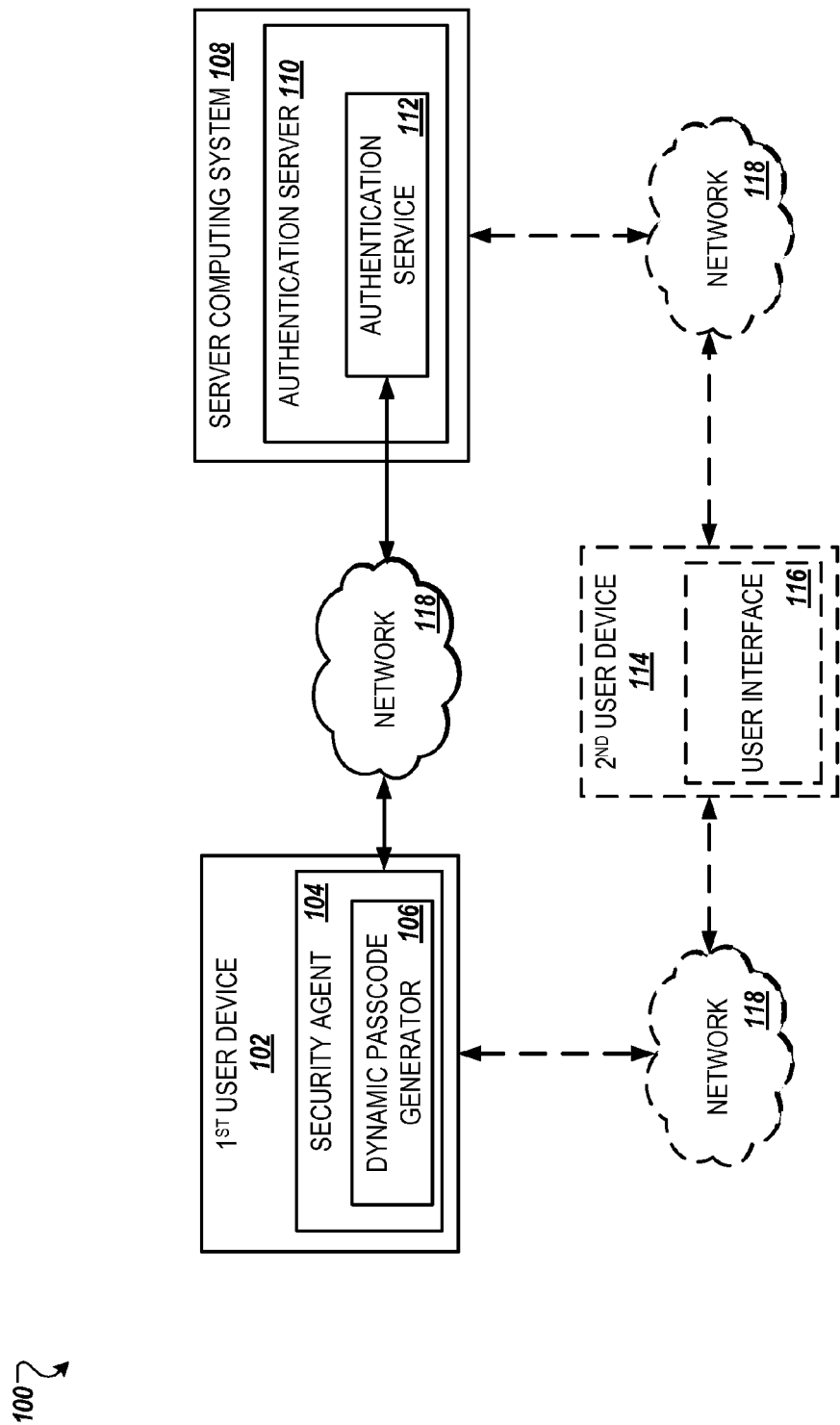
FIG. 1 illustrates an example system architecture in accordance with various implementations.

FIG. 1 illustrates example system architecture 100 in accordance with various implementations. System architecture 100 may include first user device 102, security agent 104, dynamic passcode generator 106, server computing system 108, authentication server 110, authentication service 112, second user device 114, user interface 116, and network 118. Computing systems and devices described herein (e.g. 102, 108, 114) are each capable of communicating with one another via network 118. Network 118 may include, for example, a private network such as a local area network (LAN), a wide area network (WAN), a global area network (GAN) such as the Internet, or a combination of such networks, and may include a wired or wireless network. Various networks described herein may be the same network or different networks altogether. The computing systems and user devices may be a personal computer, a tablet computer, a mobile phone such as a smart phone, a personal digital assistant (PDA), a portable media player, a netbook or the like. There can be any number of client computing systems and user devices in network architecture 100.

First user device 102 and second user device 114 may include a user interface (e.g. 116) to allow a user to lock, unlock, and perform other functions on the user device. User interface 116 may include various fields, in which a user may provide information relevant to the locking and unlocking process. User interface may also include fields to configure security agent 104 and dynamic passcode generator 106. In one embodiment, user interface 116 may include a field for the user's passcode. User interface 116 may include the lock screen of a user device.

In one embodiment, user devices 102, 114 include a subscriber identity module (SIM) card. In one embodiment, a SIM card is an integrated circuit that securely stores the international mobile subscriber identity (IMSI) and the related key used to identify and authenticate subscribers on mobile telephony devices (such as mobile phones and computers). In one embodiment, a SIM circuit is embedded into a removable plastic card. This plastic card is called a "SIM card" and can be transferred between different mobile devices. A SIM card follows certain smart card standards. A SIM card may also contain its unique serial number (ICCID), international mobile subscriber identity (IMSI), security authentication and ciphering information, temporary information related to the local network, a list of the services the user has access to and two passwords: a personal identification number (PIN) for ordinary use and a personal unblocking code (PUK) for PIN unlocking. In one embodiment, if a user removes a SIM card from a user device 102, 114, the user devices 102, 114 are no longer capable of connecting to network 118.

In one embodiment, user devices 102, 114 include an airplane mode. In one embodiment, airplane mode is a setting available on user devices 102, 114 that, when activated, suspends many of the device's signal transmitting functions, thereby disabling the device's capacity to place or receive calls or use text messaging—while still permitting use of other functions that do not require signal transmission (e.g., games, built-in camera, MP3 player). In various embodiments Bluetooth and Wi-Fi are disabled when a user device is in airplane mode. In one embodiment, user devices 102, 114 are not capable of connecting to network 118 when airplane mode is active.

In one embodiment, user devices 102, 114 include tracking technologies (e.g. geographical information systems (GIS), global positioning system (GPS), Bluetooth, radio frequency identification (RFID), near field communication (NFC), local area wireless (WLAN, Wi-Fi), local area network (LAN), Global System for Mobile Communications (GSM), and the like). In one embodiment, user devices 102, 114 are not capable of connecting to tracking technologies when airplane mode is active or the SIM card is removed.

First user device 102 may include security agent 104. Security agent 104 is a security service that may be implemented by first user device 102 or server computing system 108. In other embodiments, security agent 104 may be implemented by second user device 114 or by any other network server or processor. In one embodiment, security agent 104 is responsible for detecting a condition that indicates that a user device is in a potentially lost or stolen state and configuring the device to be in the potentially lost or stolen state by generating a dynamic passcode and locking the user device with the dynamic passcode. In another embodiment, security agent 104 is also responsible for unlocking the user device with the correct dynamic passcode is entered on the user device. In one embodiment, the dynamic passcode is entered at a user interface on the user device. In another embodiment, security agent 104 may require that a second authentication factor (in addition to the dynamic passcode) be verified before unlocking a user device. A second authentication factor such as an email to user's a registered email account may be sent to second user device 114. Using user interface 116, a user may respond to the second authentication factor on second user device 114 so as to unlock first user device 102. Second-factor authenticators will be described in detail below with respect to FIG. 2.

In one embodiment, security agent 104 utilizes dynamic passcode generator 106 to generate a dynamic passcode. Dynamic passcode generator 106 may be implemented in the hardware or software of first user device 102. In other embodiments, dynamic passcode generator 106 may be implemented by second user device 114, authentication server 110, or any other device in system 100. In one embodiment, dynamic passcode generator 106 periodically generates a passcode according to a predefined time interval (e.g. every 30 seconds, 1 minute, 2 minutes). In one embodiment, the predefined time interval may be configured by a user of first user device 102. In another embodiment, the predefined time interval may be configured on server computing system 108 and sent to user device 102 over network 118. In one embodiment, the passcode generated by dynamic passcode generator 106 may be a numeric passcode. In another embodiment, the generated passcode may be alphanumeric.

In one embodiment, security agent 104 can authenticate a condition that would otherwise indicate that a user device is potentially lost or stolen. For example. If a user of first user device 102 wishes to put first user device 102 into airplane mode before a flight, he or she may do so without activating the potentially lost or stolen state on the device 102 by first authenticating the action with security agent 104. In one embodiment, a user may authenticate a condition (e.g. removal of SIM card, activation of airplane mode) by indicating his or her desire for the condition, and entering a pin code or password on the device which is then authenticated by security agent 104.

The network 118 may be a public network (e.g., the Internet), a private network (e.g., a local area network (LAN) or a wide area network (WAN)), or a combination thereof. Network 118 may include a wireless infrastructure, which may be provided by one or multiple wireless communications systems, such as a Wi-Fi hotspot, connected with the network 118 and/or a wireless carrier system that may be implemented using various data processing equipment, communication towers, etc. User device 102, 114 may be any device capable of connecting to authentication service 112 (e.g. phone, tablet, computer). In one embodiment, network 118 is a secure network that allows for communication over a secure channel.

In one embodiment, authentication server 110 is able to communicate with user devices 102, 114 and security agent 104. In some embodiments, authentication server 110 may be a computing device (e.g., a server machine, a router, personal computer, etc.) that may provide at least some functionality related to user authentication. The authentication server 110 may be referred to as a network resource. For example, authentication server 110 may include, but is not limited to, a web server, an application server, a storage server, and a load balancing server. Authentication server 110 may be a single server or may be more than one server.

Server computing system 108, first user device 102, and second user device 114 may include one or more data stores (not shown). The data stores can be one or more centralized data repositories that store application data, system data, configuration data, or the like. The data stores may be local or remote data stores and may be single or multiple data structures (databases, repositories, files, etc.) residing on one or more mass storage devices, such as magnetic or optical storage based disks, tapes or hard drives. Data stores may store dynamic passcodes, cryptographic seeds, cryptographic functions, user configuration files, and all other information related and not related to performing dynamic on-device passcode to lock lost device.

In one embodiment, the cryptographic seed and the cryptographic function may be sent from security agent 104 to authentication service 112 over a secure channel of network 118. In one embodiment, authentication service 112 is able to create a copy of the dynamic password generated in dynamic password generator 106 by using the cryptographic seed and function sent by security agent 104. If a user recovers his or her user device 102, he or she will not know the dynamic passcode required to unlock his or her user device 102. Therefore, a user may logon to authentication service 112 to obtain a recovered copy of the dynamic passcode in order to unlock first user device 102. A validated passcode indicates that a user received a copy of the current instance of the dynamic passcode generated by the authentication service 112 or a recovered copy of the current instance of the dynamic passcode generated by the authentication service 112.

In one embodiment, authentication service 112 may validate a second authentication factor in two-step authentication. For example, if a user required to respond to an email that was sent as a second authentication factor to his or her registered email address, the user's response may be validated by authentication service 112. Authentication service 112 may verify that the email response originated from a registered user device (e.g. second user device 114) and the user's registered email account. In another embodiment, security agent 104 may validate a second authentication factor from second user device 114 in addition to validating a dynamic passcode entered on first user device 102.

In another embodiment, authentication service 112 may authenticate a user's action on user device 102. For example, if removal of the device's SIM card would normally put the device into a potentially lost or stolen state, a user may authenticate the removal first so as to keep the device in the normal, unlocked state. Authentication service 112 may perform the authentication of the removal of the SIM card. In one embodiment, Verisign Identity Protection (VIP) is an example of an authentication service. VIP is a validation and protection service developed my Symantec Corp. in Mountain View, Calif.

Figure 2:
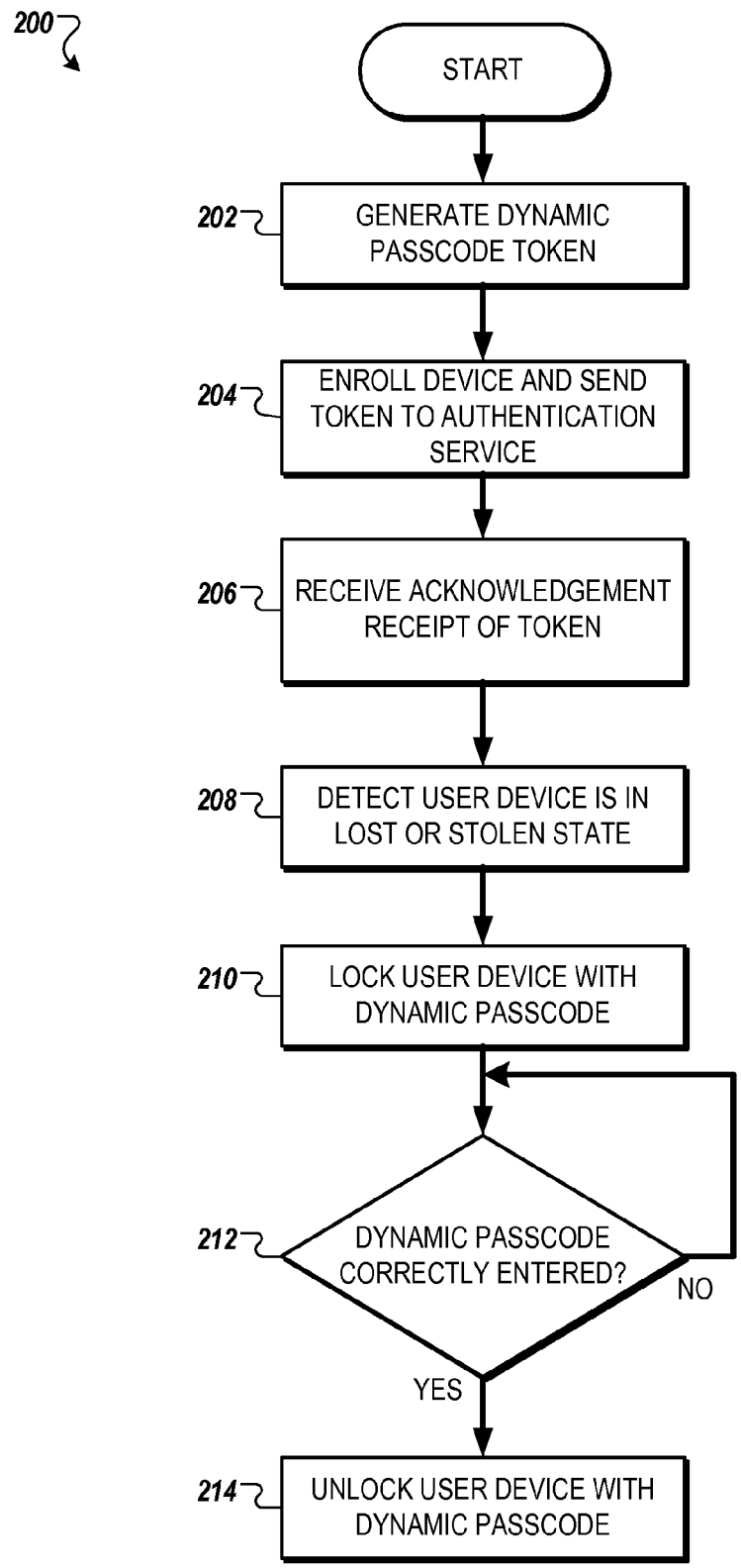
FIG. 2 is a flow diagram of a method for dynamic on-device passcode to lock lost device in accordance with some embodiments.

FIG. 2 is a flow diagram of a method for dynamic on-device passcode to lock lost device. The method 200 is performed by processing logic that comprises hardware (e.g., circuitry, dedicated logic, programmable logic, microcode, etc.), software (e.g., instructions run on a processor to perform hardware simulation), or a combination thereof. In one embodiment, security agent 104 may perform method 200. In another embodiment, other components of the devices illustrated in FIG. 1 perform some or all of the operations. Method 200 may be performed in any order so as to fit the needs of the specific authorization to be accomplished.

At block 202 processing logic generates a dynamic passcode token on the user device (e.g. first user device 102). The dynamic passcode token may be used to periodically generate dynamic passcodes. In one embodiment, the passcode is generated by dynamic passcode generator 106. In one embodiment, the dynamic passcode is based on a cryptographic seed and cryptographic function. In one embodiment, the cryptographic seed and function are time based. If time based, a time-based one-time password algorithm (TOTP) may be used, which means the token will be generated based on the shared key and the current time. In one embodiment, processing logic combines a secret key with the current timestamp using a cryptographic hash function to generate a one-time password. The timestamp may increase according to a predefined interval, so that passwords generated close together in time from the same secret key will be equal. In another embodiment, if not time-based, another type of one-time password may be generated which uses a complex mathematical algorithm, such as a hash chain, to generate a series of one-time passwords from a secret shared key.

In one embodiment, the dynamic passcode token is generated during activation of the user device. In another embodiment, the dynamic passcode token is generated sometime after activation of the user device. In one embodiment, a user may be required to accept the terms and conditions of the security agent before processing logic generates the dynamic passcode token. In various embodiments, new instances of the dynamic passcode may be generated according to predefined time interval. In some embodiments, the predefined time intervals may be configured by the user of the device. In other embodiments, the predefined interval is set automatically according to a security policy.

At block 204, a security agent (e.g. security agent 104) may enroll the user device with a backend server (e.g. authentication server 110) and receive an acknowledgement receipt. Processing logic may then generate a token using the cryptographic seed and function and synchronize the token with the backend server. Knowing the token, the authentication service can create copies of the current instance of the dynamic passcode by using the same cryptographic function as the security agent. Upon receiving of the token, the authentication service may send an acknowledgement receipt to the security agent indicating that the token has been received. In one embodiment, the security agent receives that receipt at block 206. The acknowledgement receipt assures the security agent that the authentication service has received the token, and will be able to generate copies of the current instance of the dynamic passcode upon request. In variously embodiments, blocks 204 and 206 may be repeated a second time with a second token before the security agent and the backend server are synchronized.

At block 208, processing logic detects that the user device is in a potentially lost or stolen state. In one embodiment, security agent detects a condition that indicates that the user device is in a potentially lost or stolen state. In one embodiment, removal of the user devices SIM card without first authentication of the removal from the security agent may be such a condition. In another embodiment, activation of airplane mode on the user device without first authentication of the activation from the security agent may be such a condition. In another embodiment, removing the user device from a predetermined geographical area without first authorization of the removal by the security agent may be such a condition.

At block 210 processing logic locks the user device as a result of being in the potentially lost or stolen state. In one embodiment, security agent may lock the device with the current instance of the dynamically generated passcode. In one embodiment, the current instance of the dynamically generated passcode expires after a predefined time interval, at which time a new dynamic password is generated and used to lock the device. Processing logic waits for the correct instance of the dynamic passcode to be entered at block 212 and the user device continues to be in a locked state until the correct instance of the dynamic passcode is entered on the user device. In one embodiment, a user, upon recovering his or her device, may query authentication service for a copy of the correct instance of the dynamic passcode. Upon receipt, the user may enter the received copy of the correct instance of the dynamic passcode on the user device and thereby unlock the user device (block 214).

In one embodiment, the security agent or authentication service may require that a second factor be authenticated before processing logic unlocks the user device, even after the correct instance of the dynamic passcode has correctly been entered on the device. In this case, processing logic may send a request for second factor authentication to a registered device or email account of the user. For example, processing logic may send an email to the registered email address of the user of the user device indicating that the device is being requested to unlock. The user may be given an option to confirm the unlocking or deny the unlocking of the user device. The user's response may be authenticated by processing logic. If authenticated, the user device may unlock. If not authenticated, the user device may remain in a locked state. In other embodiments, the second factor may be in the form of a text message, push notification, or any other means by which a user may indicate his or her desire to unlock the user device.

Figure 3A:
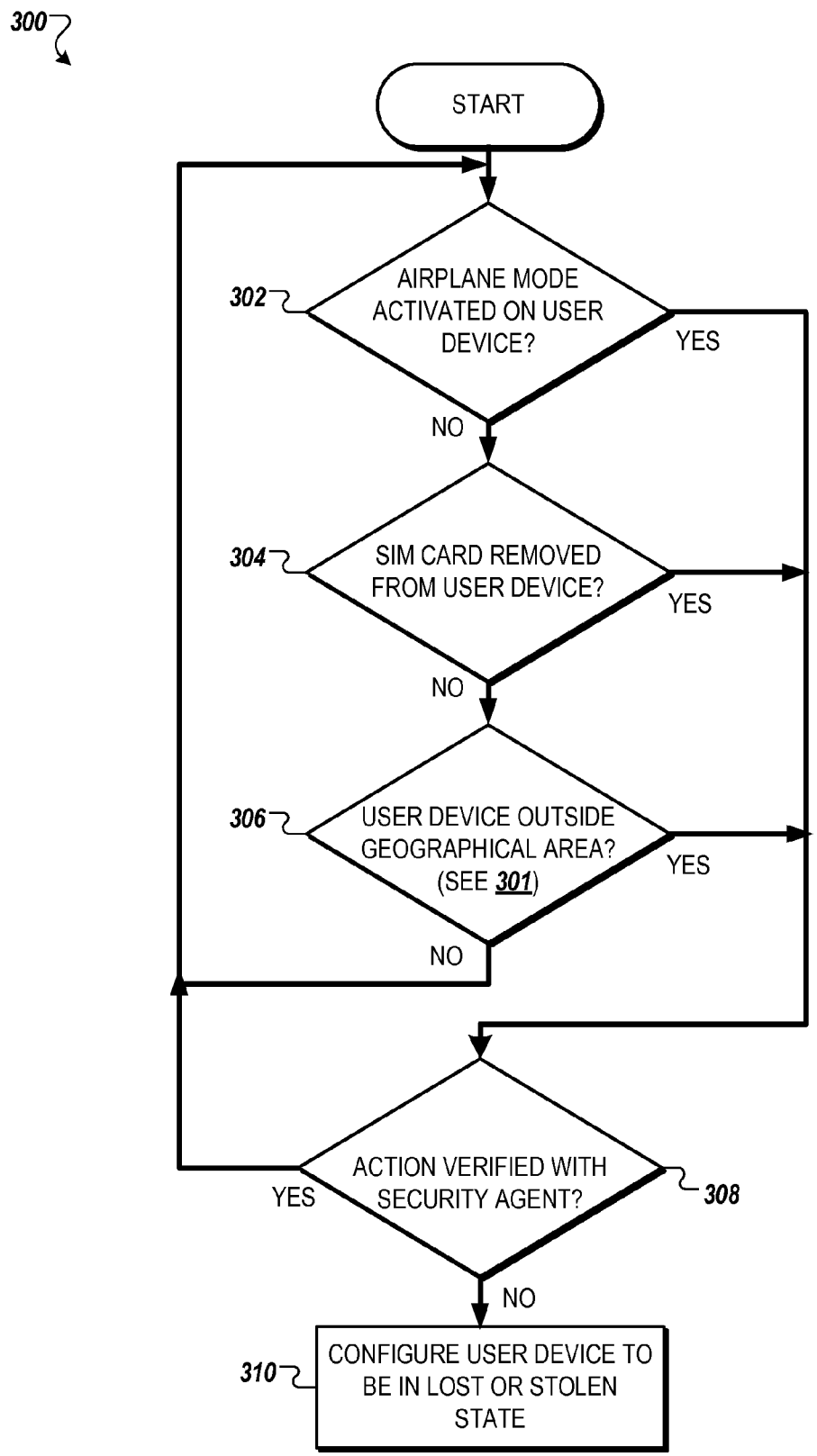
FIG. 3A is a flow diagram of a method for determining if a user device should be configured to be in a lost or stolen state in accordance with some embodiments.

FIG. 3A is a flow diagram of a method for determining if a user device should be configured to be in a lost or stolen state. The method 300 is performed by processing logic that comprises hardware (e.g., circuitry, dedicated logic, programmable logic, microcode, etc.), software (e.g., instructions run on a processor to perform hardware simulation), or a combination thereof. In one embodiment, security agent 104 may perform method 300. In another embodiment, other components of the devices illustrated in FIG. 1 perform some or all of the operations. Method 300 may be performed in any order so as to fit the needs of the specific authorization to be accomplished.

At block 302, processing logic detects whether or not airplane mode on the user device has been activated. In one embodiment, processing logic periodically checks to see if airplane mode has been activated. In another embodiment, when airplane mode is activated, a message is sent to processing logic (e.g. security agent 104) to indicate that airplane mode has been activated. If airplane mode has been activated, processing flow continues to block 308 where processing logic determines if the activation of airplane mode was first authenticated by an authentication service (e.g. authentication service 112). In one example, the authentication service may authenticate the activation if the user device is currently located at the airport. If authenticated, flow continues back to block 302 where the device remains in an unlocked (first) state. If the activation was not first authenticated, processing logic configures the user device to be in a potentially lost or stolen (second) state.

If airplane mode was not activated at block 302, processing logic at block 304 determines whether the device's SIM car has been removed. In one embodiment, processing logic periodically checks to see if the SIM card has been removed. In another embodiment, when the SIM card is removed, a message is sent to processing logic (e.g. security agent 104) to indicate that the SIM card has been removed. If the SIM card has been removed, processing flow continues to block 308 to determine of the removal was first authorized by an authentication service. If authenticated, flow continues back to block 302 where the device remains in an unlocked (first) state. If the removal was not first authenticated, processing logic configures the user device to be in a potentially lost or stolen (second) state.

If the SIM card was not removed at block 304, processing logic at block 306 determines whether the user device has been removed from a predefined geographical area. More detail regarding how processing logic makes this determination is described below with respect to FIG. 3B. If the user device has been removed from a predefined geographical area, processing flow continues to block 308 to determine of the removal was first authorized by an authentication service. If authenticated, flow continues back to block 302 where the device remains in an unlocked (first) state. If the removal was not first authenticated, processing logic configures the user device to be in a potentially lost or stolen (second) state.

It should be noted that in various embodiments flags may be set by processing logic to indicate that a particular action was first authenticated by an authentication service. For example. If airplane mode has been activated but the activation was first authenticated, processing flow may continue from block 302 to 308, where the authentication is determined and a flag is set to indicate that the action was authenticated. Since the action was authentication, processing flow may continue to the start of processing flow (block 302). At block 302, airplane mode is still activated but instead of continuing to block 308 to check authorization (which would result in an endless loop without continuing on to blocks 304 and 306) processing logic at block 302 reads the flag indicating that the activation as already authorized and flow continues to block 304 instead of 308.

In another embodiment, processing logic may configure the user device to be in a potentially lost or stolen (second) state upon receipt of a text message from a predetermined phone number indicating a user's desire to put the user device in a potentially lost or stolen state. The text message may include a code, such as "#lock#" to indicate that the user of the device wishes to put the user device into a potentially lost or stolen state.

In one embodiment, a user may determine the current instance of the dynamic passcode in various ways. In one example, a user may call the admin of the backend server to retrieve a copy of the password. A user may also, request the passcode by sending an email to a registered email account associated with the user device. A user may also retrieve a copy of the passcode by providing answers for security questions, (e.g. what is your favorite football team?). A user may also choose to have the passcode sent in a text message sent to a registered cell phone.

Figure 3B:
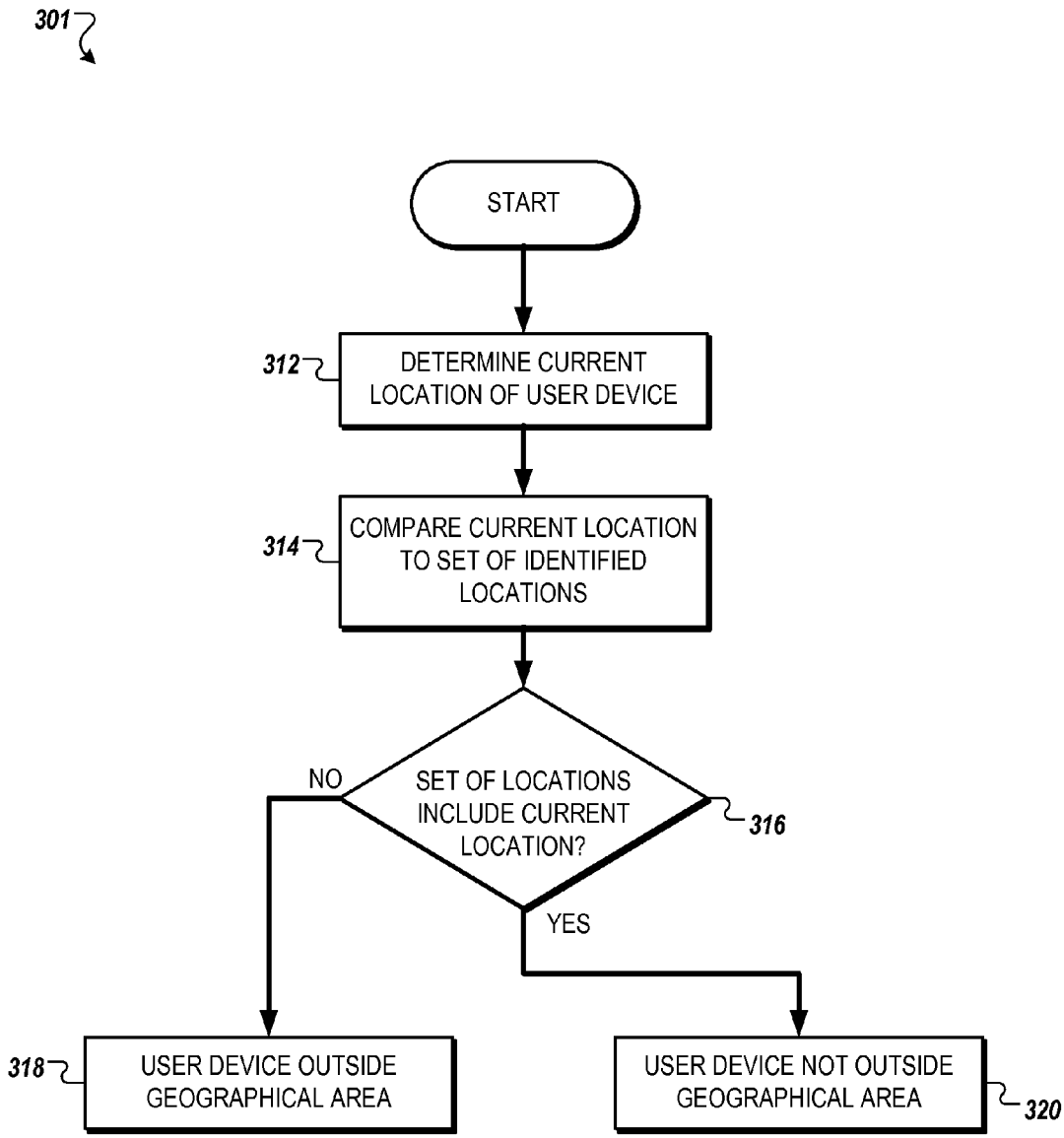
FIG. 3B is a flow diagram of a method for determining if a user device is outside a predetermined geographical area in accordance with some embodiments.

FIG. 3B is a flow diagram of a method for determining if a user device is outside a predetermined geographical area. The method 301 is performed by processing logic that comprises hardware (e.g., circuitry, dedicated logic, programmable logic, microcode, etc.), software (e.g., instructions run on a processor to perform hardware simulation), or a combination thereof. In one embodiment, security agent 104 may perform method 301. In another embodiment, other components of the devices illustrated in FIG. 1 perform some or all of the operations. Method 301 may be performed in any order so as to fit the needs of the specific authorization to be accomplished.

At block 312, processing logic determines the current location of the user device. In one embodiment, processing logic utilizes the locating technologies discussed above to make a determination. At block 214, processing logic compares the current location determined in block 312 to a set of identified locations. In one embodiment, a user may configure the set of identified locations to include geographical areas which he or she visits or expects to visit. At block 316, processing logic determines if the set of identified locations includes the user device's current location. If so, processing logic continues to block 320, which indicates that the user device is not outside a predefined geographical area. If the set of identified locations does not include the current location of the user device, the user device is determined to be outside the predefined geographical area at block 318. In one embodiment, a user may configure method 301 to include a set of identified geographical areas in which the user intends to never travel. In this case, if the set of identified locations includes the current location of the user device, the device will be determined to be outside the predefined geographical area.

Figure 4:
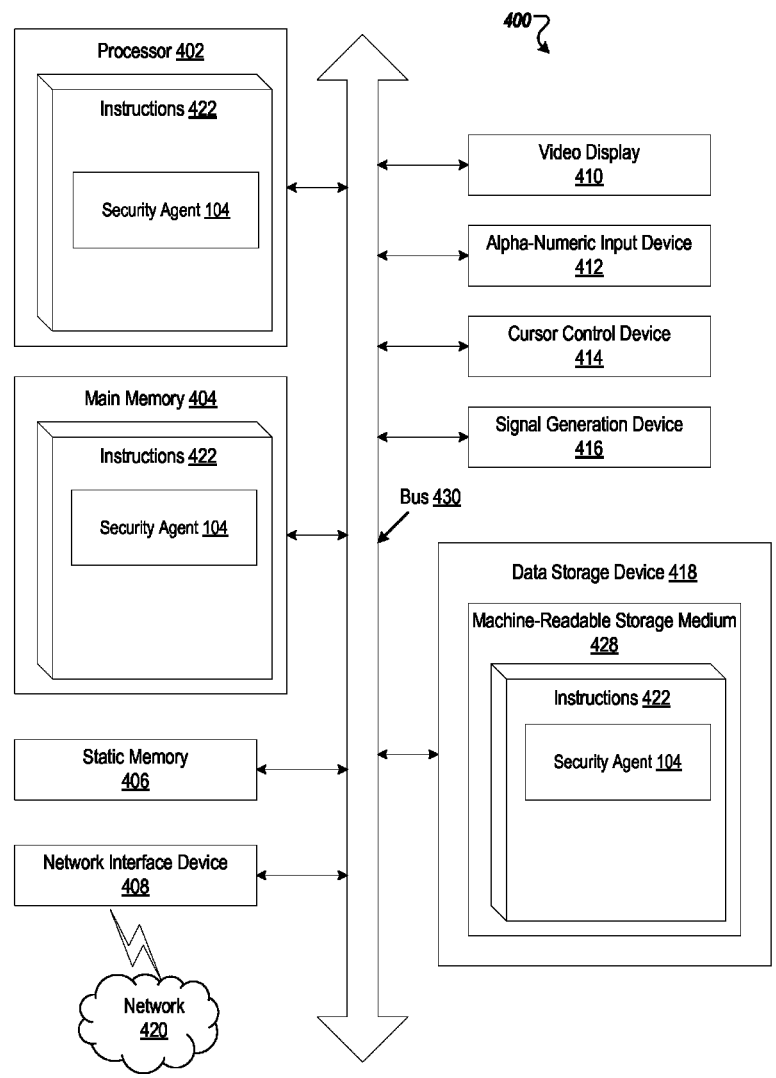
FIG. 4 is a block diagram of an example computer system that may perform one or more of the operations described herein.

FIG. 4 illustrates an example machine (e.g. first user device 102) of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processor 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a data storage device 418, which communicate with each other via a bus 430.

Processor 402 represents one or more general-purpose processors such as a microprocessor, a central processing unit, or the like. More particularly, the processor may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 402 may also be one or more special-purpose processors such as an application specific integrated circuit (ASIC), a field programmable gate array (FPGA), a digital signal processor (DSP), network processor, or the like. The processor 402 is configured to execute instructions 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-readable storage medium 428 (also known as a computer-readable medium) on which is stored one or more sets of instructions or software 422 embodying any one or more of the methodologies or functions described herein. The instructions 422 may also reside, completely or at least partially, within the main memory 404 and/or within the processor 402 during execution thereof by the computer system 400, the main memory 404 and the processor 402 also constituting machine-readable storage media.

In one implementation, the instructions 422 include instructions for a security service (e.g., security agent 104 of FIG. 1 and/or a software library containing methods that call modules or sub-modules in an OTP/push validation service. While the machine-readable storage medium 428 is shown in an example implementation to be a single medium, the term "non-transitory computer-readable storage medium" or "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating" or "sending" or "receiving" or "detecting" or "locking" or "unlocking" or "configuring" or "comparing" or "prompting" or "validating" or "defining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to a user device for performing the operations herein. This user device may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other user device. Various general purpose systems may be used with programs in accordance with the teachings herein, or it may prove convenient to construct a more specialized user device to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   periodically generating, by a security agent executing on a processor of a user device, a dynamic passcode using a cryptographic function and a cryptographic seed according to a predefined time interval, wherein a first instance of the predefined time interval and a second instance of the predefined time interval have a same duration and occur chronologically;
   while the user device is in a first state, sending, by the security agent, the cryptographic seed to an authentication service executing on a server device over a network;
   receiving an acknowledgement of receipt of the cryptographic seed from the authentication service;
   detecting, by the security agent, that the user device is in second state, wherein the second state is a potentially lost or stolen state based on a defined condition of the user device;
   locking the user device with a first instance of the dynamic passcode in response to the detecting that the user device is in the potentially lost or stolen state;
   locking the user device with a second instance of the dynamic passcode in response to the detecting that the user device is in the potentially lost or stolen state, when the first instance of the dynamic passcode expires; and
   unlocking the user device when a current instance of the dynamic passcode is correctly entered on the user device, wherein the current instance of the dynamic passcode expires after a current time interval.

2. The method of claim 1, wherein the detecting that the user device is in the second state comprises:
   detecting activation of an airplane mode on the user device; and
   determining that the airplane mode is activated without first verifying the activation with the security agent on the user device.

3. The method of claim 1, wherein the detecting that the user device is in the second state comprises:
   detecting removal of a subscriber identification module (SIM) card from the user device; and determining that the SIM card is removed without first verifying the removal with the security agent on the user device.

4. The method of claim 1, further comprising:
   determining, by the security agent, a current location of the user device;
   comparing the current location to a set of one or more locations identified in a profile stored on the user device; and
   configuring the user device to be in the second state when the set of locations does not comprise the current location of the user device.

5. The method of claim 1, further comprising:
   prompting a user interface of a second user device to receive a second factor before unlocking the user device; and
   validating the second factor to authenticate a user of the user device.

6. The method of claim 5, wherein prompting the user interface of the second user device to receive a second factor comprises sending an email to a registered email account of the user, wherein the user must verify ownership of the user device by responding to the email.

7. The method of claim 1, further comprising defining, by the security agent, the predefined time interval.

8. The method of claim 1, wherein the cryptographic seed is sent to the authentication service over a secure channel.

9. The method of claim 1, wherein unlocking the user device comprises validating, by the security agent, a passcode entered at the user device, wherein the entered passcode is validated when the entered passcode matches the current instance of the dynamic passcode.

10. A user device comprising:
    a memory device; and
    a processor coupled to the memory device, wherein the processor is to execute a security agent, the security agent to:
    periodically generate a dynamic passcode using a cryptographic function and a cryptographic seed according to a predefined time interval, wherein a first instance of the predefined time interval and a second instance of the predefined time interval have a same duration and occur chronologically;
    send the cryptographic seed to an authentication service executing on a server device over a network while the user device is in a first state;
    receive an acknowledgement of receipt of the cryptographic seed from the authentication service;
    detect that the user device is in second state, wherein the second state is a potentially lost or stolen state based on a defined condition of the user device;
    lock the user device with a first instance of the dynamic code in response to the detecting that the user device is in the potentially lost or stolen state;
    lock the user device with a second instance of the dynamic passcode in response to the detecting that the user device is in the potentially lost or stolen state, when the first instance of the dynamic passcode expires; and
    unlock the user device when a current instance of the dynamic passcode is correctly entered on the user device, wherein the current instance of the dynamic passcode expires after a current time interval.

11. The user device of claim 10, wherein the security agent is further to:
    detect activation of an airplane mode on the user device; and
    determine that the airplane mode is activated without first verifying the activation with the security agent on the user device.

12. The user device of claim 10, wherein the security agent is further to:
    detect removal of a subscriber identification module (SIM) card from the user device; and
    determine that the SIM card is removed without first verifying the removal with the security agent on the user device.

13. The user device of claim 10, wherein the security agent is further to:
    determine a current location of the user device;
    compare the current location to a set of one or more locations identified in a profile stored on the user device; and
    configure the user device to be in the second state when the set of locations does not comprise the current location of the user device.

14. The user device of claim 10, wherein the security agent is further to:
    prompt a user interface of a second user device to receive a second factor before unlocking the user device; and
    validate the second factor to authenticate a user of the user device.

15. The user device of claim 10, wherein the security agent is further to define the predefined time interval.

16. The user device of claim 10, wherein the security agent is further to send the cryptographic seed to the authentication service over a secure channel.

17. The user device of claim 10, wherein to unlock the user device the security agent is further to validate, by the security agent, a passcode entered at the user device, wherein the entered passcode is validated when the entered passcode matches the current instance of the dynamic passcode.

18. A non-transitory computer readable storage medium including instructions that, when executed by a processor, cause the processor to perform operations comprising:
    periodically generating, by a security agent executing on a processor of a user device, a dynamic passcode using a cryptographic function and a cryptographic seed according to a predefined time interval, wherein a first instance of the predefined time interval and a second instance of the predefined time interval have a same duration and occur chronologically;
    while the user device is in a first state, sending, by the security agent, the cryptographic seed to an authentication service executing on a server device over a network;
    receiving an acknowledgement of receipt of the cryptographic seed from the authentication service;
    detecting, by the security agent, that the user device is in second state, wherein the second state is a potentially lost or stolen state based on a defined condition of the user device;
    locking the user device with a first instance of the dynamic code in response to the detecting that the user device is in the potentially lost or stolen state;
    locking the user device with a second instance of the dynamic passcode in response to the detecting that the user device is in the potentially lost or stolen state, when the first instance of the dynamic passcode expires; and
    unlocking the user device when a current instance of the dynamic passcode is correctly entered on the user device, wherein the current instance of the dynamic passcode expires after a current time interval.

19. The non-transitory computer readable storage medium of claim 18, wherein the detecting that the user device is in the second state comprises:

detecting removal of a subscriber identification module (SIM) card from the user device; and determining that the SIM card is removed without first verifying the removal with the security agent on the user device.

20. The non-transitory computer readable storage medium of claim 18, wherein unlocking the user device comprises validating, by the security agent, a passcode entered at the user device, wherein the entered passcode is validated when the entered passcode matches the current instance of the dynamic passcode.

\* \* \* \* \*